(12) United States Patent
Tsyrklevich

(10) Patent No.: US 9,959,761 B2
(45) Date of Patent: May 1, 2018

(54) SYSTEM AND METHOD FOR LOCATING AVAILABLE PARKING SPACES

(71) Applicant: Parkopedia Limited, Birmingham (GB)

(72) Inventor: Eugene Tsyrklevich, San Diego, CA (US)

(73) Assignee: Parkopedia Limited, San Diego, CA (US)

( * ) Notice: Subject to any disclaimer, the term of this patent is extended or adjusted under 35 U.S.C. 154(b) by 0 days. days.

(21) Appl. No.: 15/628,405

(22) Filed: Jun. 20, 2017

(65) Prior Publication Data

US 2017/0287330 A1    Oct. 5, 2017

Related U.S. Application Data

(63) Continuation of application No. 14/652,382, filed as application No. PCT/US2013/076921 on Dec. 20, 2013, now abandoned.

(60) Provisional application No. 61/745,408, filed on Dec. 21, 2012.

(51) Int. Cl.
| | |
|---|---|
| *G08G 1/14* | (2006.01) |
| *G08G 1/065* | (2006.01) |
| *G08G 1/01* | (2006.01) |
| *G01C 21/36* | (2006.01) |

(52) U.S. Cl.
CPC ......... *G08G 1/144* (2013.01); *G01C 21/3667* (2013.01); *G08G 1/0112* (2013.01); *G08G 1/0116* (2013.01); *G08G 1/065* (2013.01); *G08G 1/143* (2013.01)

(58) Field of Classification Search
CPC ...... G08G 1/144; G08G 1/0112; G08G 1/065; G08G 1/0116; G08G 1/143; G01C 21/3667

See application file for complete search history.

(56) References Cited

U.S. PATENT DOCUMENTS 9,672,741 B2 *   6/2017   Scofield ................. G08G 1/141

* cited by examiner

*Primary Examiner* — Anne M Antonucci
(74) *Attorney, Agent, or Firm* — Orrick, Herrington & Sutcliffe LLP

(57) ABSTRACT

This application is directed to a system and method for locating parking spaces. A user can enter the desired location for parking and the application will transmit the information to a parking information database server. The server will return the location of parking spaces and probability of space availability. In addition, the database includes detailed parking information to include price, hours, and any special restrictions. These results can be depicted as a list or graphically displayed on a street map, satellite map or hybrid map views. Filters can be applied to find a specific type of parking available. The application provides real-time availability information in areas where the infrastructure to generate such data is available via sources such as on-street sensors or parking lot barrier systems. The system uses various secondary information to adjust historical observations of space availability in order to make provide accurate space predictions.

17 Claims, 16 Drawing Sheets

280

290

SYSTEM AND METHOD FOR LOCATING AVAILABLE PARKING SPACES

CROSS-REFERENCE TO RELATED APPLICATIONS

This application is a continuation of U.S. patent application Ser. No. 14/652,382, filed Jun. 15, 2015, which is a U.S. National Stage under 35 USC 371 of PCT/US13/76921 filed Dec. 20, 2013, which claims benefit of U.S. provisional patent application Ser. No. 61/745,408, entitled "System and Method for Locating Available Parking Spaces," filed Dec. 21, 2012. Priority to each of the prior applications is expressly claimed, and the disclosures of the applications are hereby incorporated herein by reference in their entireties and for all purposes.

FIELD OF THE INVENTION

This application is directed to a system and method of using secondary sources of data to predict parking space availability using a web-based, portable electronic device, or in-vehicle application. Examples of secondary sources of data include parking transactions, historical parking space availability and vehicle movement data.

BACKGROUND OF THE INVENTION

A significant proportion of city traffic today is generated by vehicles seeking a suitable and available parking location. To reduce this problem, drivers need to know where parking is available. The present application provides real-time availability information in areas where the infrastructure to generate such data is available via sources such as on-street sensors or parking lot barrier systems. Such infrastructure is not widely adopted therefore the system of the present disclosure uses algorithms and models to calculate parking space availability from secondary sources of information such as historical transaction and availability data, vehicle position and movement plus a number of other environment factors which all influence patterns of car parking behavior.

Current applications for locating parking merely depict the location of parking lots, garages or street parking. These applications do not predict the availability of parking based on secondary sources of information.

BRIEF DESCRIPTION OF THE INVENTION

This application is directed to a system and method for locating available parking spaces using any one of the following applications: a web-based system, a portable electronic device or an in-vehicle system.

The systems and methods of the present disclosure use statistical and machine learning techniques to produce forecasts of current and future parking availability given only secondary inputs. The statistical and machine learning techniques includes, but is not limited to, supervised learning to build regression models trained on historical observations of secondary data and parking availability. These mathematical models, algorithms and software take in multiple inputs of information and produce predictions of parking space availability on a given street, parking lot or city. This prediction is then presented to drivers online, on a mobile application or inside a vehicle.

In one embodiment, the system predicts available parking spaces through use of real-time space available counts from street and parking garage information and analyzes historical space counts from both streets spaces and parking garages. Using this data, the system identifies trends of space availability throughout a given day (e.g. 85% of spaces available at 8:00 am in a specified lot, 77% available at 9:30 am, etc.). This data can be used to predict expected spaces at a given time. As future availability can be different from in the past, the system incorporates real-time data inputs into the model to adjust historical trends to the current conditions. For example, if it is known that events tend to increase the number of cars being parked around a venue, the system can adjust trend-based availability forecasts on event days accordingly.

The application discloses a method for locating parking spaces, comprising transmitting electronically a requested location where parking is desired to a database server over a communication medium and calculating a probable parking space location in the vicinity of the requested location based on a historical parking information stored in a database electronically connected to the database server and transmitting the location and probability of a parking space over the communication medium. Further modifications of the method include: wherein the requested location for parking is entered and transmitted from a portable electronic device; wherein the probable parking locations are depicted on an electronic depiction of a street map; where the database server predicts parking space availability based on a plurality of floating car data that captures vehicle movement information from vehicles driving around the requested location looking for a space; wherein the database server predicts parking space availability based on a plurality of floating car data, wherein said floating cellular data captures the arrival and departure of vehicles from the requested location based on change of speed of a plurality cellular signals to indicate pedestrian versus vehicle movement; wherein the database server predicts parking availability trends for a requested location based on historical parking space counts collected throughout the day and extrapolates future availability based on said trends; wherein the database server adjusts predictions of real-time parking space availability from the historical availability trends using inputs such as current day of the week, month, time of the day, weather, state of the public transport system, planned events, real-time availability in adjacent parking lots and streets, real-time parking payment transactions, real-time Electronic Point of Sale (EPOS) transactions, real-time traffic and floating car data, real-time imagery (satellite or camera-based), real-time space availability as reported by parking enforcement systems, real-time space availability as reported by a user.

The application further discloses a computer implemented method suitable for implementation on a processor comprising transmitting electronically a requested location where parking is desired to a database server over a communication medium, calculating a probable parking space location in the vicinity of the requested location based on a historical parking information stored in a database electronically connected to the database server, transmitting the location and probability of a parking space over the communication medium; wherein said transmitting and calculating is performed by a processor. Further modifications of the computer implemented method include: wherein the requested location for parking is entered and transmitted from a portable electronic device; wherein the probable parking locations are depicted on an electronic depiction of a street map; wherein the database server predicts parking space availability based on a plurality of floating car data that captures vehicle movement information from vehicles driving around the requested location looking for a space; wherein the database server predicts parking space availability based on a plurality of floating car data, wherein said floating cellular data captures the arrival and departure of vehicles from the requested location based on change of speed of a plurality cellular signals to indicate pedestrian versus vehicle movement; wherein the database server predicts parking availability trends for a requested location based on historical parking space counts collected throughout the day and extrapolates future availability based on said trends; wherein the database server adjusts predictions of real-time parking space availability from the historical availability trends using inputs such as current day of the week, month, time of the day, weather, state of the public transport system, planned events, real-time availability in adjacent parking lots and streets, real-time parking payment transactions, real-time Electronic Point of Sale (EPOS) transactions, real-time traffic and floating car data, real-time imagery (satellite or camera-based), real-time space availability as reported by parking enforcement systems, real-time space availability as reported by a user.

The application further discloses a system for locating parking spaces, comprising an electronic device in communication with a database server, the database server connected to a database, wherein the database server is capable of predicting parking space information for an area based on information on the database; wherein the database contains a plurality of parking space data. This data can include a collection of localization data including speed, direction of travel and time information from mobile phones. Further modifications of this system include: wherein the electronic device is incorporated into a vehicle; wherein the database server incorporates parking space information from a plurality of floating car data into the space availability calculation for an area, wherein said floating car data captures vehicle movement information from vehicles driving around a block looking for a space; wherein the database server incorporates information from a plurality of floating car data into the space availability forecast for an area, wherein said floating cellular data captures the arrival and departure of vehicles from said area based on change of speed of the cellular signal to indicate pedestrian versus vehicle movement; wherein the database server calculates parking availability trends for a parking lot or a street based on historical parking space counts collected throughout the day and extrapolates future availability based on said trends; wherein the database server makes real-time parking space availability adjustments to the historical availability trends using inputs such as current day of the week, month, time of the day, weather, state of the public transport system, planned events, real-time availability in adjacent parking lots and streets, real-time parking payment transactions, real-time Electronic Point of Sale (EPOS) transactions, real-time traffic and floating car data, real-time imagery (satellite or camera-based), real-time space availability as reported by parking enforcement systems, real-time space availability as reported by a user.

BRIEF DESCRIPTION OF THE DRAWINGS

The above and other features of the invention, its nature and various advantages will be more apparent upon consideration of the following detailed description, taken in conjunction with the accompanying drawings in which.

Figure 1:
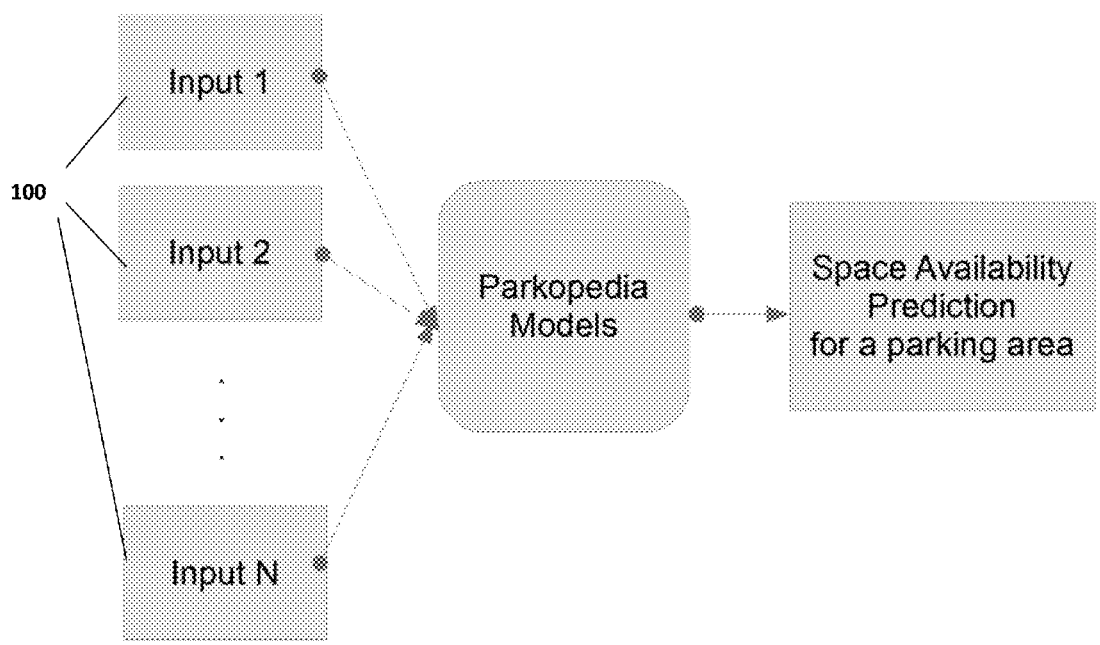
FIG. 1 illustrates an exemplary a block diagram of the simplified prediction algorithm.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF PREFERRED EMBODIMENTS

FIG. 1 depicts block diagram of the simplified software architecture. The inputs 100 of system and method depicted in FIG. 1 can be used to predict availability of parking spaces. These secondary inputs used can vary from location to location, and the weighting factors afforded to each of these inputs can also vary from location to location. For example, the day of the week may be a key factor in determining available parking for City A which sees a high increase in tourism during the weekend, consequently resulting in a lower percentage of available parking on weekends as compared during the work week. City B may see no change in available parking due to tourism on the weekend, and consequently the day of week will have less or little influence on the prediction of available parking. These inputs can consist of:

a. Floating car data (FCD) that is data about vehicle speed, directions, etc. collected from cars and mobile devices. Floating car data, also known as floating cellular data, is a method to determine the traffic speed on the road network. It is based on the collection of localization data, speed, direction of travel and time information from mobile phones in vehicles that are being driven. These data are the essential source for traffic information and for most intelligent transportation systems (ITS). This means that every vehicle with an active mobile phone acts as a sensor for the road network. Based on these data, traffic congestion can be identified, travel times can be calculated, and traffic reports can be rapidly generated. In contrast to traffic cameras, number plate recognition systems, and induction loops embedded in the roadway, no additional hardware on the road network is necessary.

Floating cellular data is cellular network data-based (CDMA, GSM, UMTS, GPRS) information. No special devices/hardware are necessary: every switched-on mobile phone becomes a traffic probe and is as such an anonymous source of information. The location of the mobile phone is determined using (1) triangulation or (2) the hand-over data stored by the network operator. As GSM localization is less accurate than GPS based systems, many phones must be tracked and complex algorithms used to extract high-quality data. For example, care must be taken not to misinterpret cellular phones on a high speed railway track near the road as incredibly fast journeys along the road. However, the more congestion, the more cars, the more phones and thus more probes. In metropolitan areas where traffic data are most needed the distance between cell sites is lower and thus precision increases. Advantages over GPS-based or conventional methods such as cameras or street embedded sensors include: No infrastructure or hardware in cars or along the road. It is much less expensive, offers more coverage of more streets, it is faster to set up (no work zones) and needs less maintenance.

b. Space counts reported by parking attendants on the street. This information may be manually or automatically recorded. This information can automatically be entered into a database system or automatically updated through a communication medium such as the internet.

c. Space counts reported by automated parking enforcement systems (e.g. cars with cameras). These systems can update the database information in the database by automatically transmitting the information through a communication medium such as the internet.

d. Space counts reported by users either manually or in an automated fashion. This information may be manually or automatically recorded. This information can automatically be entered into a database system or automatically updated through a communication medium such as the internet.

e. Historical space count snapshots collected by Parkopedia throughout a given day. This information may be manually or automatically recorded.

f. Satellite imagery can be used to locate available parking spaces and update historical database information on the availability of parking spaces.

g. Web cams (street or in-car) can be used to locate available parking spaces or update historical database information on the availability of parking spaces.

h. Electronic Points of Sale (EPOS) systems (restaurants next to parking lots, etc.) can be used to locate available parking spaces or update historical information on the availability of parking spaces.

i. Pedestrian traffic count systems can be used to locate available parking spaces or update historical information on the availability of parking spaces.

j. Current state of public transport can be used to predict availability of parking spaces or update historical information on the availability of parking spaces. For example, if a public transport system, such as the subway system, is inoperative, this can be used as a factor in determining the availability of parking spaces in the area.

k. Weather can be used to predict availability of parking spaces or update historical information on the availability of parking spaces.

l. Availability in adjacent parking areas can be used to predict availability of parking spaces or update historical information on the availability of parking spaces.

m. Planned events can be used to predict availability of parking spaces or update historical information on the availability of parking spaces.

n. Historical parking transactions can be used to predict availability of parking spaces or update historical information on the availability of parking spaces.

o. Real-time parking transactions can be used to predict availability of parking spaces or update historical information on the availability of parking spaces.

p. Time of day can be used to predict availability of parking spaces or update historical information on the availability of parking spaces.

q. Day of week can be used to predict availability of parking spaces or update historical information on the availability of parking spaces.

r. Month can be used to predict availability of parking spaces or update historical information on the availability of parking spaces.

Figure 2:
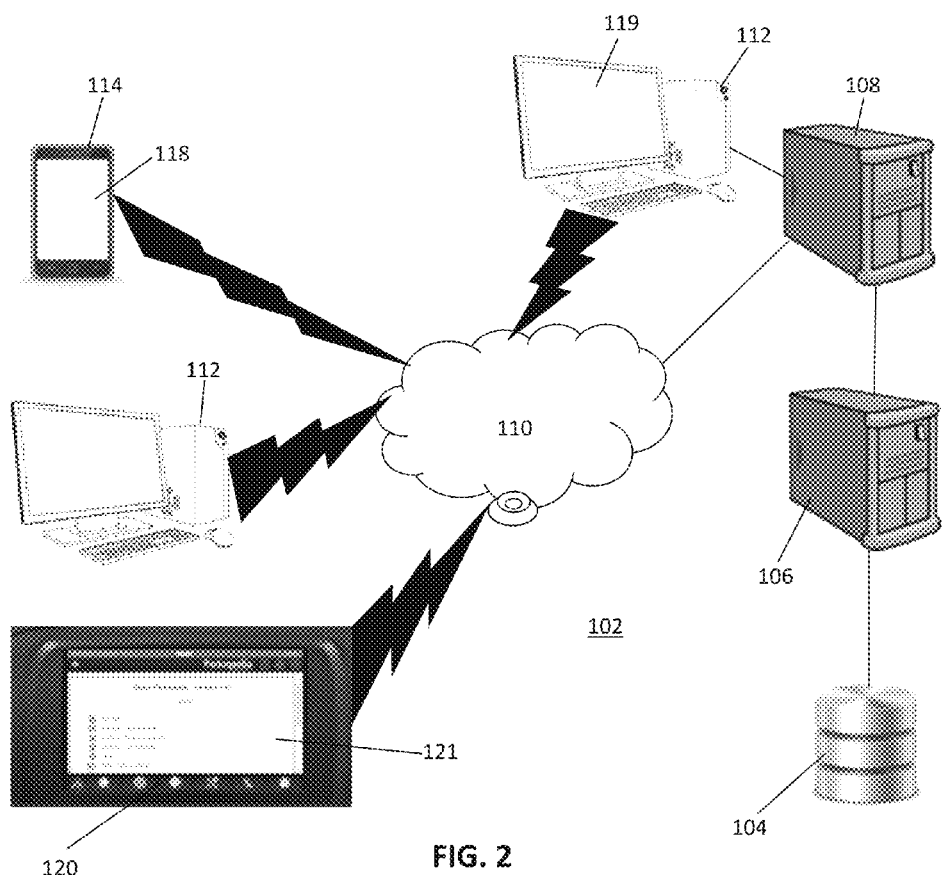
FIG. 2 illustrates an exemplary a block diagram of system architecture.

FIG. 2 provides a high-level block diagram of an exemplary networked computer system depicting the parking space prediction system 102 architecture. In a preferred embodiment, the system includes a parking space database 104. The database 104 is a computer database accessible via electronic communication which contains valuation information on a plurality of parking spaces to include street parking, parking lot and parking garage data. The database 104 is preferably updated daily to include the most accurate, up-to-date parking information. Alternatively, the database 104 can be updated on other periodic bases. The database 104 is communicatively connected to a database server 106, and may reside on the database server 106 or on a separate computer and/or one or more separate database storage devices. The database server 106 hosts a database management system for managing the steps of writing and reading data to and from the database 104. The database server 106 controls the flow of information to and from the database 104.

The database server 106 is communicatively connected to a web server 108. The web server 108 hosts information, documents, scripts, and software needed to provide user interfaces and enable performance of methodologies in accordance with an exemplary embodiment of the system and method. By way of example and not limitation, the web server 108 may include web page information, documents and scripts (e.g. HyperText Markup Language (HTML) and Extensible Markup Language (XML)), applets, and application software, which enables users to request available parking spaces at specified locations and input information on available parking spaces. The web server 108 connects the database server 106 to a communication medium 110 such as internet.

In one embodiment, the database server incorporates information from floating car data (FCD) into the space availability forecast for an area. This floating car data is generated by specially equipped vehicles which capture vehicle movement information from vehicles driving around a block looking for a space.

In one embodiment, the database server uses the information from floating cellular data into the space availability forecast for an area. The floating cellular data captures the arrival and departure of vehicles from said area based on change of speed (pedestrian versus vehicle movement).

In one embodiment, the database server calculates parking availability trends for a parking lot or a street based on historical parking space counts collected throughout the day and extrapolates future availability based on said trends.

In one embodiment, the database server makes real-time parking space availability adjustments to the historical availability trends using inputs such as current day of the week, month, time of the day, planned events, real-time availability in adjacent parking lots and streets, real-time parking payment transactions, real-time Electronic Point of Sale (EPOS) transactions, real-time traffic and floating car data, real-time imagery (satellite or camera-based), real-time space availability as reported by parking enforcement systems, real-time space availability as reported by a user.

In one embodiment, access to the web server 108 is accomplished through use of a personal computer 112 which is electronically connected to the communication medium 110 such as the internet. This connection may be through a wired or wireless local area network.

A plurality of users 114 may access the web server 108 using compatible computing devices with network connectivity. By way of example, such devices may include personal computers, laptop computers, handheld computers, personal digital assistants, kiosks, portable electronic devices, mobile phones or any compatibly equipped electronic computing devices. User computing systems may include an operating system and a browser or similar application software configured to properly process and display information, documents, software, applications, applets and scripts provided by the web server 108. Although two personal computers 112, one portable electronic device 114, and one in-vehicle application 116 are shown for illustrative purposes, any number of user computers may be used in accordance with the system and method. The in-vehicle embodiment adds the application to the vehicles existing navigation system allowing a user to find parking at either current location or navigation system destination.

In one embodiment, access to the web server 108 is accomplished through use of a portable electronic device 114 which electronically connects to the communication medium 110 such as the internet. The portable electronic device 114 can electronically connect directly to the communication medium 110 or be electronically connected to a personal computer 112 which connects to the communication medium 110.

In one embodiment, a user 114 may access the system 102 through a portable electronic device 114 through an application or through a personal computer 112 through use of a web browser.

In one embodiment, the parking space information may be depicted on the display 116 of a personal computer 112 or display 118 of portable electronic device 114 or the display 121 of the in-vehicle system 120.

The system 102 is not limited to any particular network connectivity or communication protocol. Various forms of communication networks may be used by personal computers 112 or portable electronic device 114 or in-vehicle systems 120 to access the web server 108. By way of example and not limitation, a proprietary Wide Area Network (WAN) or a public WAN, such as a communication medium 110 such as the internet, may be used. These networks typically employ various protocols such as the HyperText Transfer Protocol (HTTP), File Transfer Protocol (FTP), Extensible Markup Language (XML), and Transfer Control Protocol/Internet Protocol (TCP/IP) to facilitate communication of information between communicatively coupled computers. The system 102 may also utilize wireless networks, including those utilizing Global System for Mobile (GSM), Code Division Multiple Access (CDMA), Long Term Evolution (LTE) or Time Division Multiple Access technology, and the Wireless Application Protocol (WAP). Furthermore, the system 102 may utilize any, all, and any combination of such communications networks, as well as communications networks hereafter developed.

The computing devices described herein (e.g., personal computers, handheld computers, servers, portable electronic devices) may be comprised of commercially available computers, hardware and operating systems. In some embodiments, the portable electronic device is an Apple device such as an iPhone, iPod, iPad, iPad mini, etc. The data is transmitted over the portable electronic devices internet connection. In some embodiments, the portable electronic device is an Android device. A portable electronic device 114 can further include any a portable electronic device that the user may hold in his or her hand, such as a digital media player, a personal e-mail device, a personal data assistant ("PDA"), a cellular telephone, a handheld gaming device, or a digital camera.

The data is transmitted over the portable electronic device's internet connection. The aforementioned computing devices are intended to represent a broad category of computer systems capable of functioning in accordance with the present invention. Of course, the computing devices may include various components, peripherals and software applications provided they are compatible and capable of performing functions in accordance with the present invention. The computing devices also include information, documents, data and files needed to provide functionality and enable performance of methodologies in accordance with an exemplary embodiment of the invention.

A firewall may be located between web server 108 and the database server 106 to protect against corruption, loss, or misuse of data. The firewall limits access by the web server 108 and prevents corruption of data. Thus, the web server 108 may be configured to update and receive data only to the extent necessary. The firewalls may be comprised of any hardware and/or software suitably configured to provide limited or restricted access to the database server 106. The firewalls may be integrated within the database server 106 or another system component, or may reside as a standalone component.

Functions and process steps described herein may be performed using programmed computer devices and related hardware, peripherals, equipment and networks. When programmed, the computing devices are configured to perform functions and carry out steps in accordance with principles of the invention. Such programming may comprise operating systems, software applications, software modules, scripts, files, data, digital signal processors (DSP), application-specific integrated circuit (ASIC), discrete gate logic, or other hardware, firmware, or any conventional programmable software, collectively referred to herein as a module.

Figure 3:
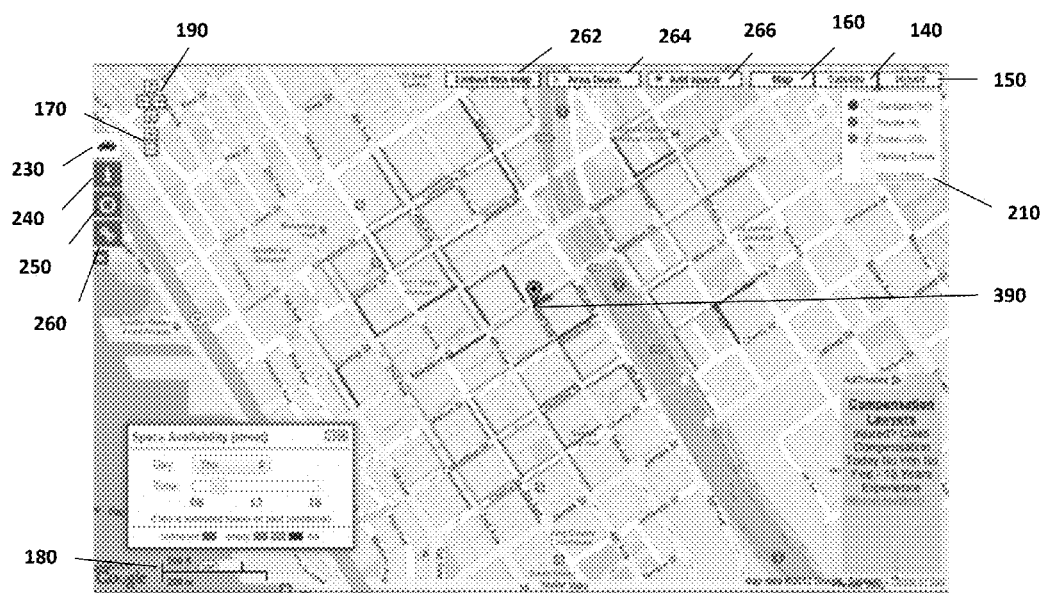
FIG. 3 illustrates an exemplary embodiment of the web-based system.
Figure 4:
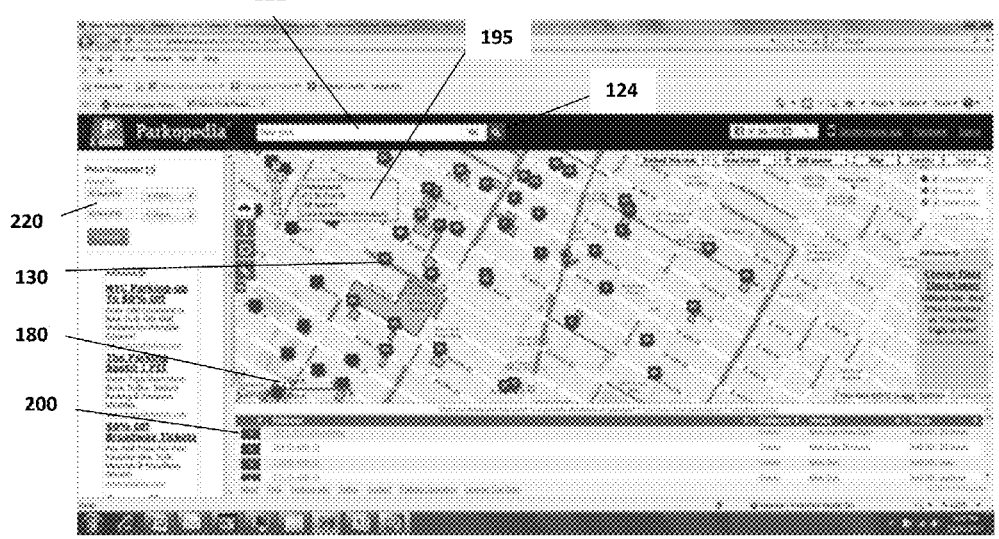
FIG. 4 illustrates another exemplary embodiment of the web-based embodiment.

FIGS. 3 and 4 depict nominal displays of the web-based application. In the web-based embodiment a user visits Parkopedia's web-page (www.parkopedia.com). A user 114 enters the location where parking is desired into the location data box 122. One of the country flags can be selected to the right of the location data box 122 to indicate the country in which parking is desired. After location is entered, the "Find Parking" button 124 or magnifying glass icon to the right of the location data box is selected. The information is transmitted over the communication medium 110 to the data server 106 via the web-server 108. For the web-based embodiment, a map and a list of parking for the desired location is displayed on a street map displaying parking icons 130 of geographic locations of known parking. The street map depiction can be changed to a satellite view or hybrid view (satellite view with street names) by selected either the "Satellite" 140 or "Hybrid" 150 buttons on the screen. The user can return to the street map by selecting the "Map" 160 button. The scale of the map can be changed using plus (+) and minus (−) boxes 170 on the map display. The currently selected map scale 180 is depicted on the map. The center of the map can be moved, by the arrows on the screen 190 or right clicking and moving the pointer or mouse cursor in a desired direction.

Holding the pointer or mouse cursor over one of the icons 130 produces an abbreviated information box 195. Selecting the icons 130 or number 200 on the results list by double-clicking the right button on the mouse or pointer control produces a pop-up box providing additional information regarding the selected parking. The pop-up box displays detailed information regarding parking (i.e. type, features, acceptable payment methods, number of spaces, operating hours, and prices). Another tab in the pop-up box provides the street address and links the user to Google map features to provide directions to the selected parking facility. Another tab lists reviews on parking attributes such as cost, security, and convenience, and user's ratings between 0 and 5 stars. Another tab on the pop-up box displays the Google Street view for the entrance to the parking facility. Various filters 210 can also be selected from the street map view to filter the parking facilities displayed.

A price calculator 220 is displayed prompting the user to enter the From/To dates and times parking is desired. If the user desired to enter the From/To dates, the results returned allowing for sorting of the results by distance, hours of operation and total cost. Selecting the vehicle icon 230 displays the price calculator in the left margin of the screen. Selecting the "i" icon 240 provides general information about parking in the selected location in the left margin of the screen. Selecting the cross-hair icon 250 provides information on places nearby in the left margin of the screen. Selecting the link icon 260 allows users to link the parking information to their web-sites.

The map can be embedded in another website through the "Embed this map" button 262. By selecting the "Area Deals" button 264 will display a pop-up box allowing a user to enter an email address in which details for parking in the selected vicinity will be sent. The user is able to add a space through use of the "Add space" button 266 on the map display. Add Space button is used by drivers to submit information and photos of any location which is missing from the database. Thus submitted information and photo of the space is sent to the database server where it will be manually reviewed and a missing parking location will then be added if required.

Figure 5:
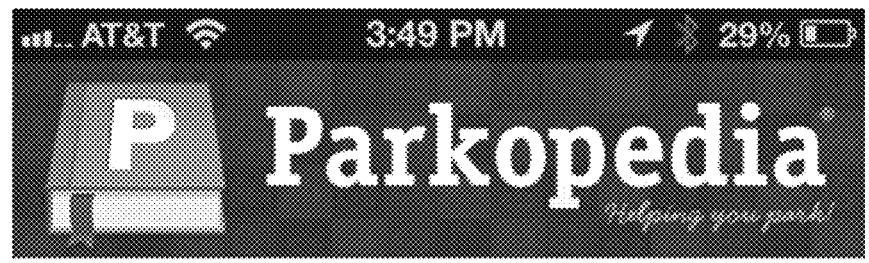
FIG. 5 illustrates an exemplary embodiment of the portable electronic device embodiment.
Figure 5:
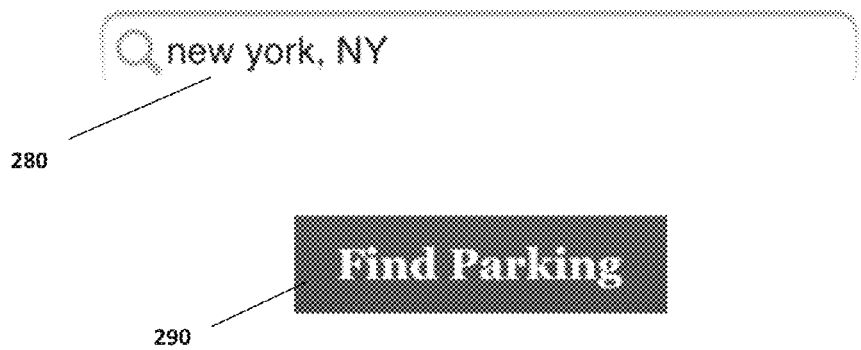
Figure 5:

FIG. 5 depicts the opening page of the portable electronic device application. To find parking a user enters a location (city, state, country) into the location data box 280 to find nearby parking. Leaving the entry blank in the location data box will find parking nearby the location of the portable electronic device 114 using the device's integrated position sensor (e.g. global positioning system receiver). Street addresses, zip codes and attractions (i.e. Yankee Stadium) can also be entered. After pressing the "Find Parking" button 290, the application will connect to the database server 104 and search on locations based on the either the entered location or the location of the device. If no parking spaces are found, an alert notification will be generated.

Figure 6:
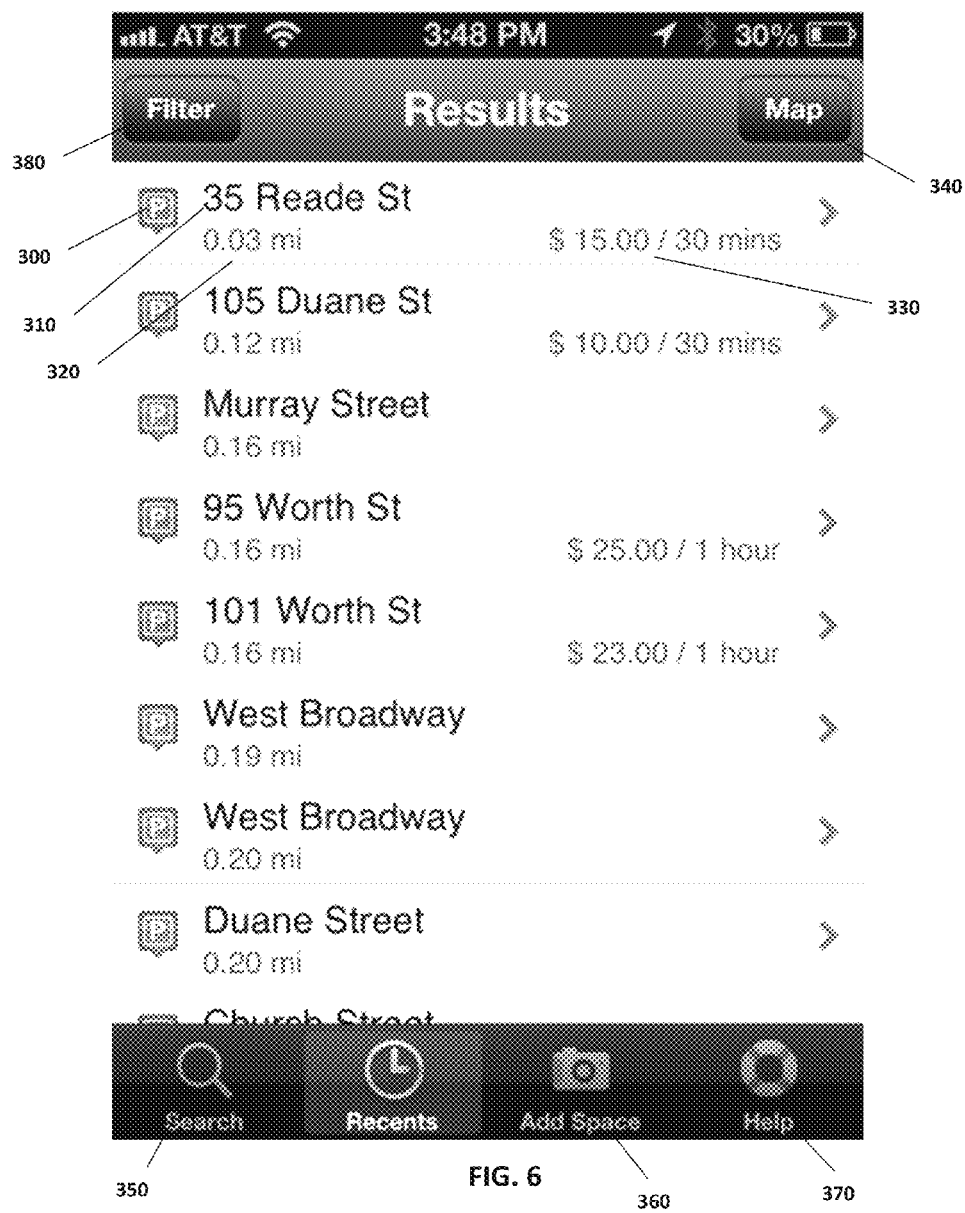
FIG. 6 illustrates an exemplary depiction of the results list page of the portable electronic device embodiment.

FIG. 6 depicts the results list page of the portable electronic device 114 embodiment. In one embodiment of the present system, up to 50 parking results will be displayed for the selected location. The results are generated in order of location from the search origin either entered or geographic position of the portable electronic device. By default parking facilities are sorted by distance from the selected location and are returned to the web browser using standard web HTTP protocol. Each result will contain an icon 300, name 310, distance 320 from the selected location and price 330. The type of icon 300 on the results list indicates whether the space is a parking lot/garage, street parking meter, free street parking, and a side indicator informing the user if there is plenty of spaces, limited spaces or no spaces available. Selecting a result will display further information such as the address and full parking details such as phone number, type (i.e. underground, manned), features (i.e. extra large spaces, bike racks), acceptable payment methods (i.e. coins, bills, credit cards), total number of spaces, hours of operation, prices, and additional description (i.e. additional fees for oversized vehicles and monthly rates). Selecting the "Map" button 340 on the Results page will result change to the Map view. Selecting the "Search" button 350 will change to the opening page view. Selecting the "Add space" button 360 will allow users to photograph available spaces. This data with the photograph is then electronically transmitted to database server 106. Selecting the "Help" button 370 will change the display to the "Help" screen. Selecting the "Filter" button 380 will change the display to the "Filter" display menu.

Figure 7:
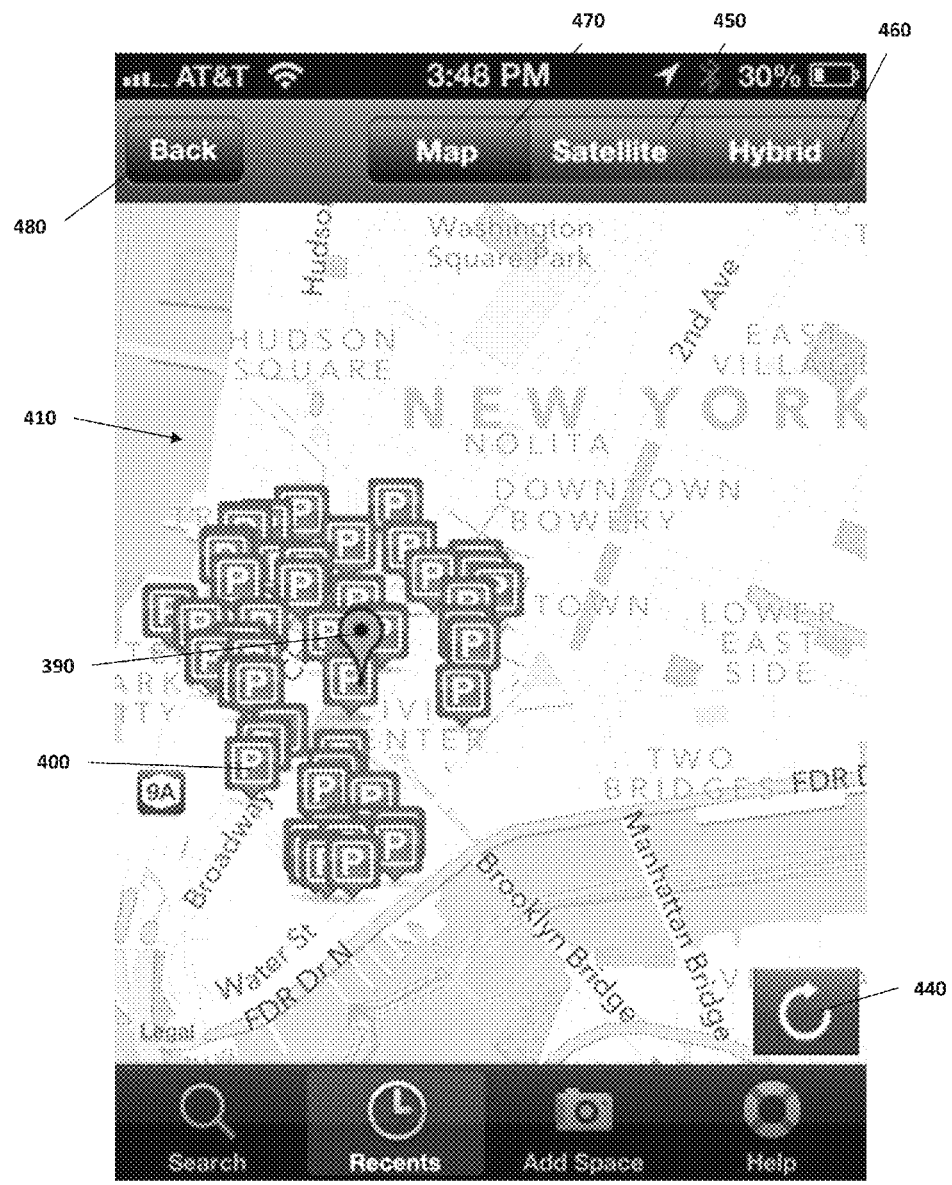
FIG. 7 illustrates an exemplary depiction of the results map page of the portable electronic device embodiment.

FIG. 7 depicts the results map page screen shot of the portable electronic device embodiment. The results map page screen plots the parking spaces on a map display at their geographic positions. The center of the search location is depicted at the pushpin 390 location displayed. Parking space icons 400 are plotted on the map at the geographic location of parking. The scale of the map can be changed by zooming in and out on the display by moving two fingers apart or together respectively on the touch screen display 410. The center of the display can be changed by moving a finger around the touch-screen display 410. Street names, points of interest and parking spaces are depicted in the map view. Selecting one of the parking space icons 400 will display a data box 420 which displays the name, location from search origin and price. Depressing the refresh button 440, connects the application to the database server 106 to refresh the availability of parking spaces on the map. The map display can be changed to a Satellite depiction by depressing the "Satellite" button 450 on the display. A combination street map/satellite image can be selected by selecting the "Hybrid" button 460. A user can return to the street map by selecting the "Map" button 470. A user can return to the results list view by selecting the "Back" button 480.

Figure 8:
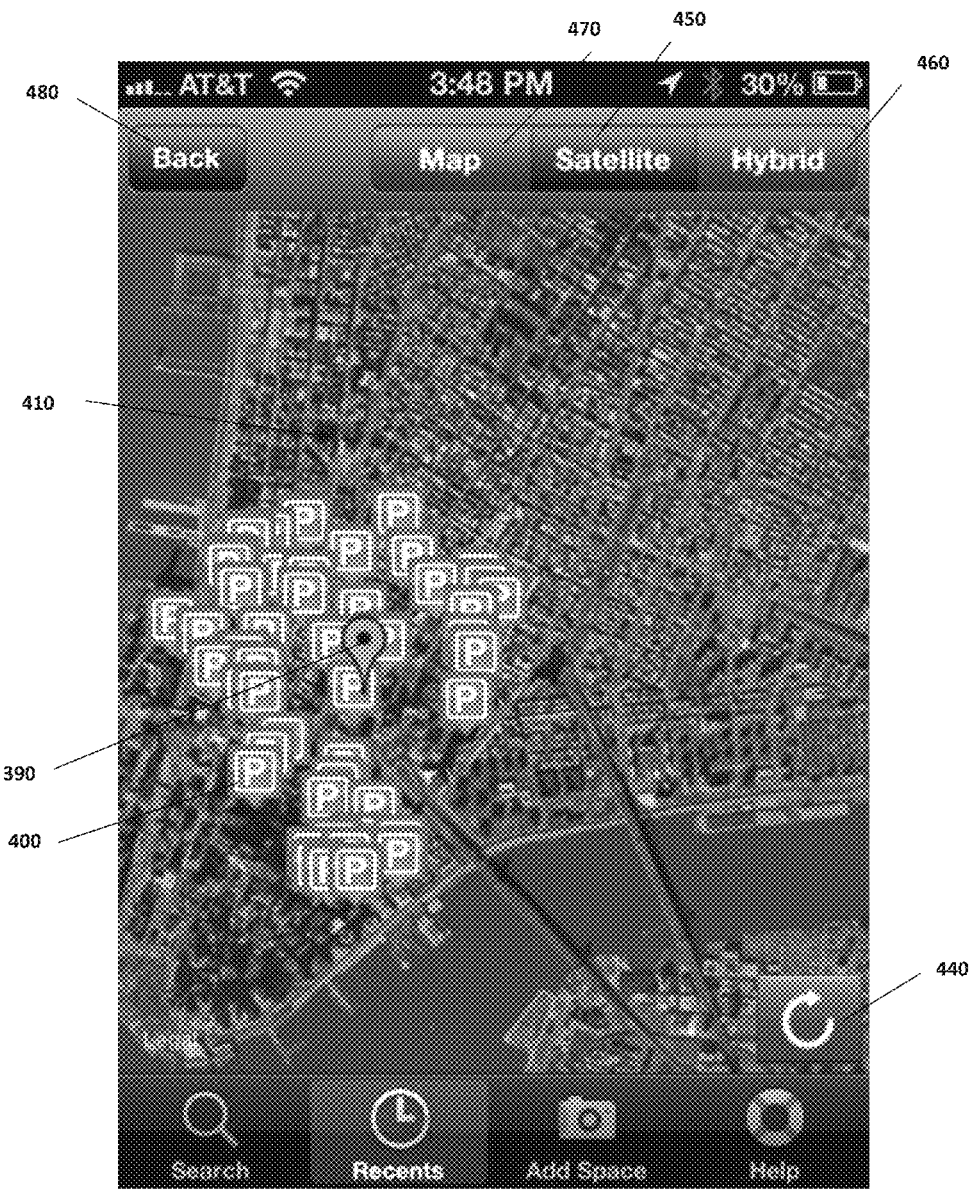
FIG. 8 illustrates an exemplary depiction of the satellite page of the portable electronic device embodiment.

FIG. 8 depicts the results satellite page screen shot of the portable electronic device embodiment. Similar to the map screen the parking spaces are depicted based on their geographic location on a non-real time satellite image of the area. The search location is depicted from the pushpin 390 displayed. Parking space icons 400 are plotted on the map at the geographic location of parking. The scale of the map can be changed by zooming in and out on the display by moving two fingers apart or together respectively on the touch screen display 410. The center of the display can be changed by moving a finger around the touch-screen display 410. Street names, points of interest and parking spaces are depicted in the map view. Selecting one of the parking space icons 400 will display a data box 420 which displays the name, location from search origin and price. Selecting the additional information arrow 430 in the data box 420 will display the detailed parking information screen. Depressing the refresh button 440, connects the application to the database server 106 to refresh the availability of parking spaces on the map. The map display can be changed to a Satellite depiction by depressing the "Satellite" button 450 on the display. A combination street map/satellite image can be selected by selecting the "Hybrid" button 460. A user can return to the street map by selecting the "Map" button 470. A user can return to the results list view by selecting the "Back" button 480. The green lines indicated on the map indicate available street parking.

Figure 9:
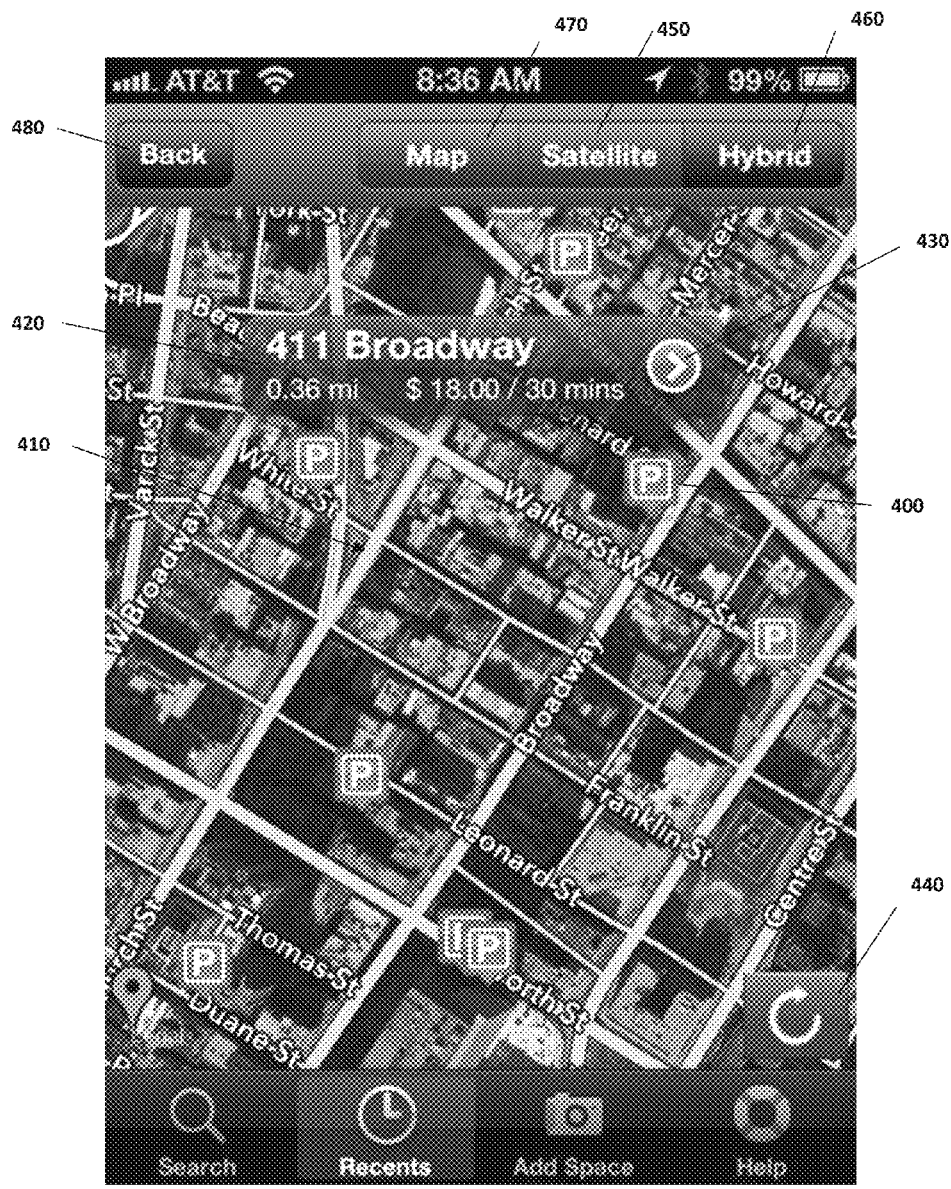
FIG. 9 illustrates an exemplary depiction of the results satellite page of the portable electronic device embodiment.

FIG. 9 depicts the results hybrid page screen shot of the portable electronic device embodiment. This display adds street names to the satellite view. Similar to the map screen and satellite view, the parking spaces are depicted based on their geographic location. Selecting the additional information arrow 430 in the data box 420 will display the detailed parking information screen.

Figure 10:
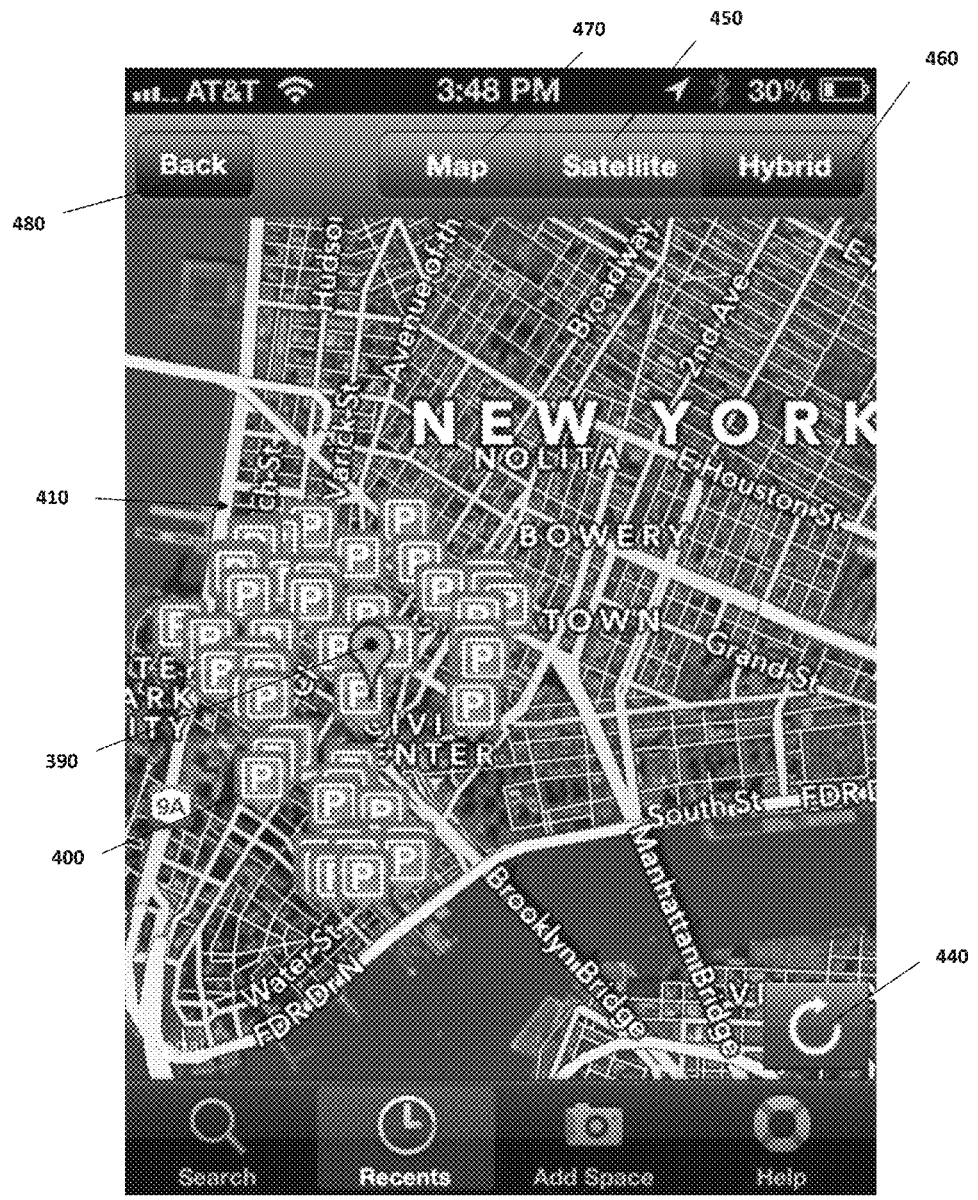
FIG. 10 illustrates an exemplary depiction of the results hybrid page of the portable electronic device embodiment.

FIG. 10 depicts in further detail the hybrid screen page. The search location is depicted from the pushpin 390 displayed. Parking space icons 400 are plotted on the map at the geographic location of parking. The scale of the map can be changed by zooming in and out on the display by moving two fingers apart or together respectively on the touch screen display 410. The center of the display can be changed by moving a finger around the touch-screen display 410. Street names, points of interest and parking spaces are depicted in the map view. Selecting one of the parking space icons 400 will display a data box 420 which displays the name, location from search origin and price. Selecting the additional information arrow 430 in the data box 420 will display the detailed parking information screen. Depressing the refresh button 440 connects the application to the database server 106 to refresh the availability of parking spaces on the map. The map display can be changed to a Satellite depiction by depressing the "Satellite" button 450 on the display. A combination street map/satellite image can be selected by selecting the "Hybrid" button 460. A user can return to the street map by selecting the "Map" button 470. A user can return to the results list view by selecting the "Back" button 480.

Figure 11:
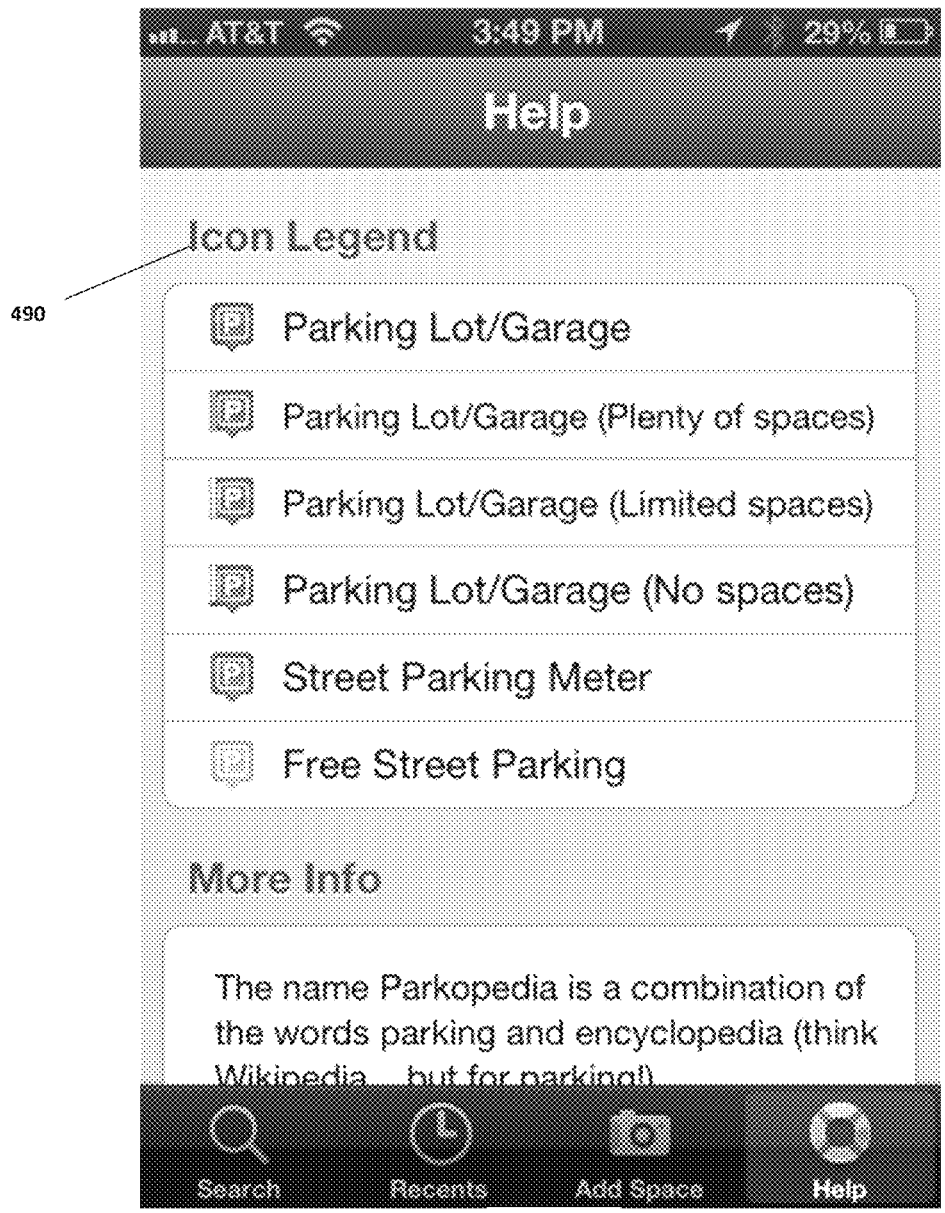
FIG. 11 illustrates an exemplary depiction of the help page of the portable electronic device embodiment.

FIG. 11 depicts the help page screen page of the portable electronic device embodiment. The help screen displays an Icon Legend 490 providing the meaning of the displayed icons. Finally, a method to provide Feedback to Parkopedia via the portable electronic device's email is provided. The email automatically indicates the version of Parkopedia being used to assist in the feedback process.

Figure 12:
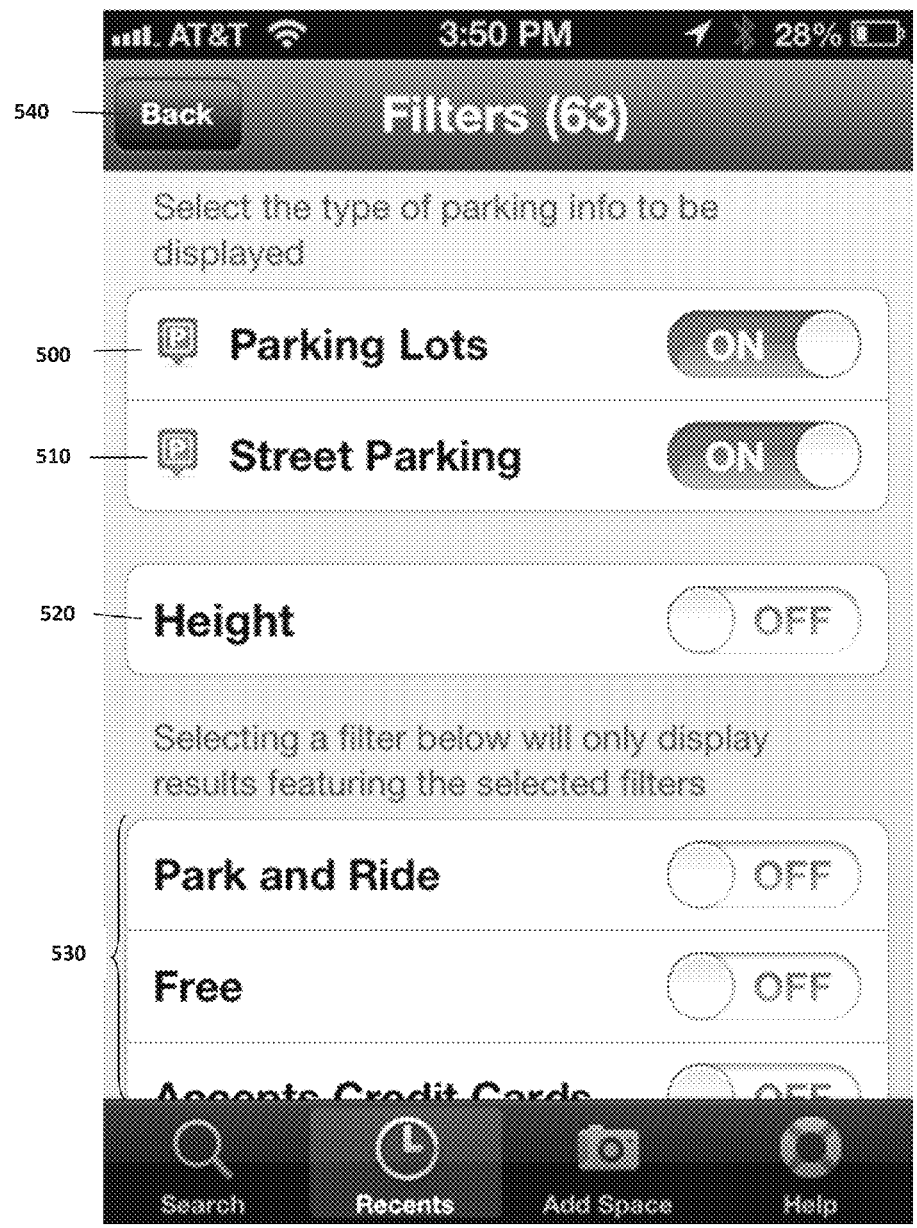
FIG. 12 illustrates an exemplary depiction of the upper portion of the filters page of the portable electronic device embodiment.
Figure 13:
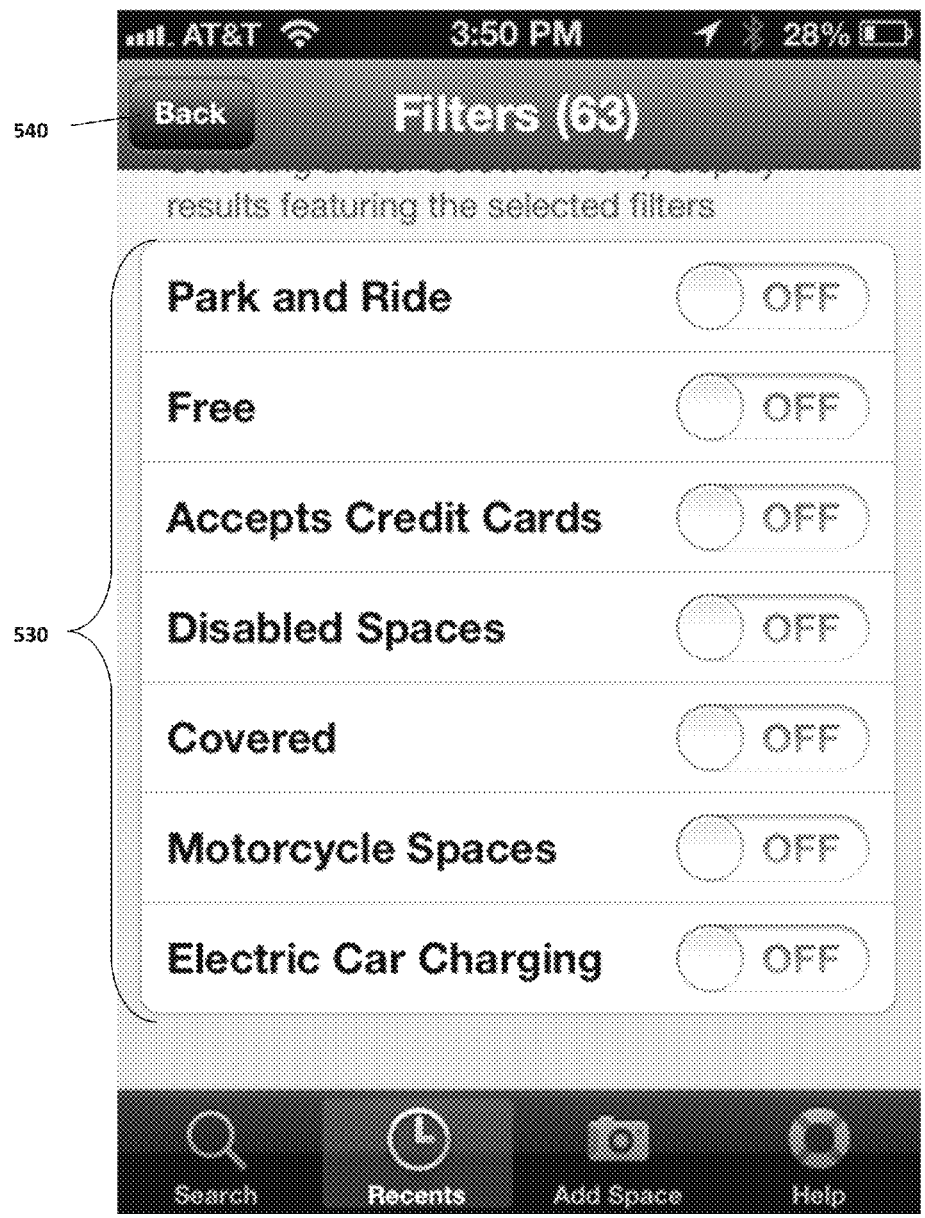
FIG. 13 illustrates an exemplary depiction of the lower portion of the filters page of the portable electronic device embodiment.

FIGS. 12 and 13 depict the Filters page of the portable electronic device embodiment. Selecting the Parking Lots 500, Street Parking 510, and Height 520 filters will select the type of parking information displayed in the results. The remaining filters 530, once selected, will only display results featuring the selected filters. Selecting "Back" button 540 on the Filters display will return to the "Results" page.

Figure 14:
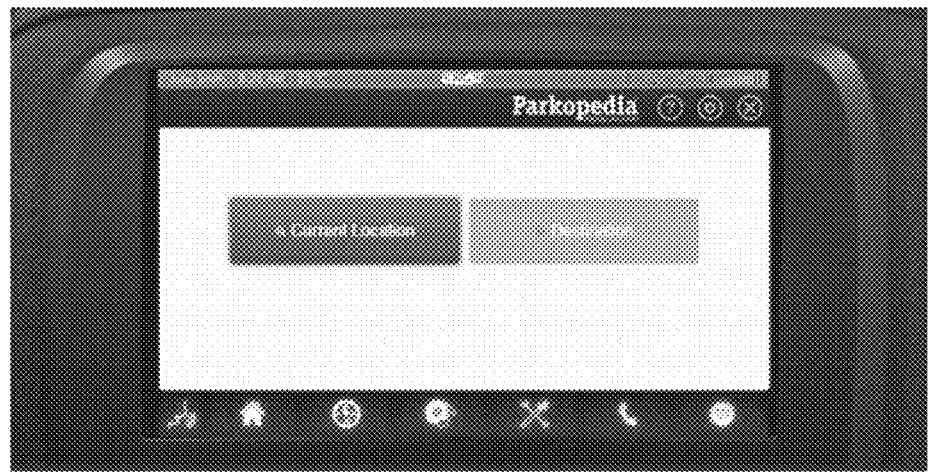
FIG. 14 illustrates an exemplary depiction of the start page of the in-vehicle parking application embodiment.

FIG. 14 depicts the start page of the in-vehicle application embodiment. The user 114 can select between finding parking at the current geographic location of the vehicle or at a destination entered into the vehicle's navigation system.

Figure 15:
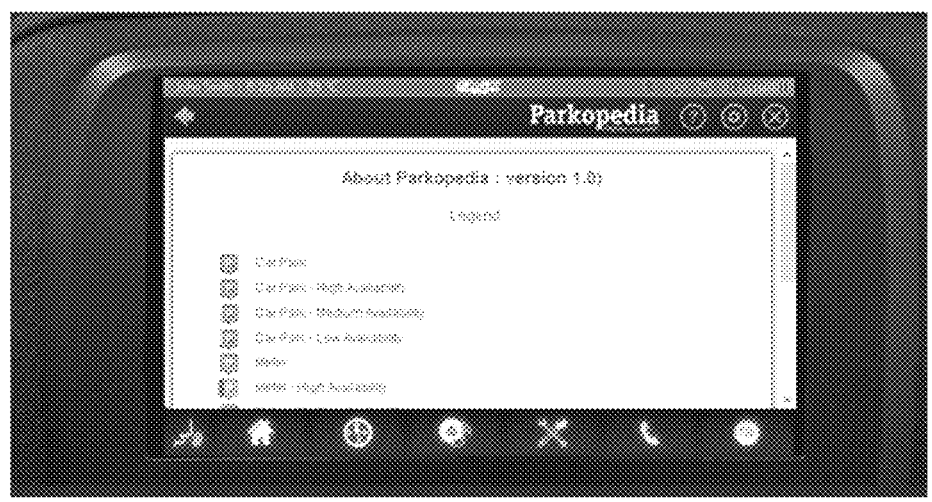
FIG. 15 illustrates an exemplary depiction of the upper portion of the legend of the in-vehicle parking application embodiment.
Figure 16:
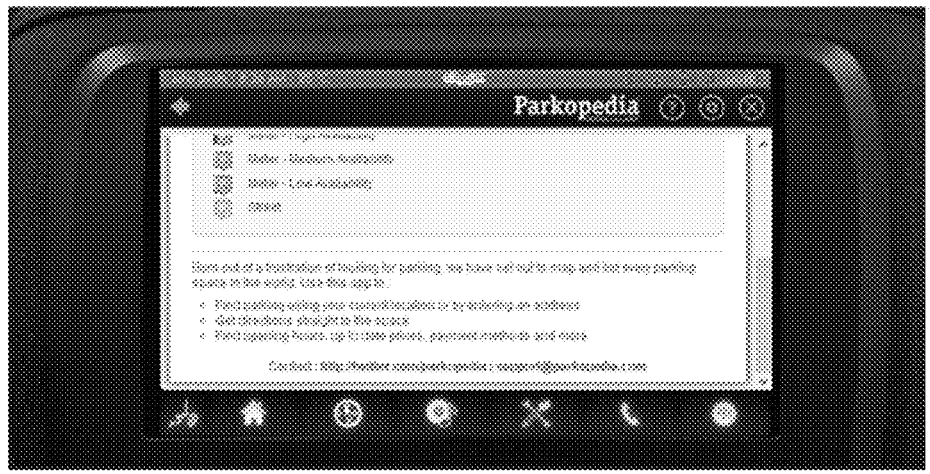
FIG. 16 illustrates an exemplary depiction of the lower portion of the legend for the in-vehicle parking application embodiment.

FIGS. 15 and 16 depict the upper and lower portions of the legend for the in-vehicle embodiment. The legend depicts all the different parking icons used by the application and their applicable meanings for the in-vehicle application embodiment.

Figure 17:
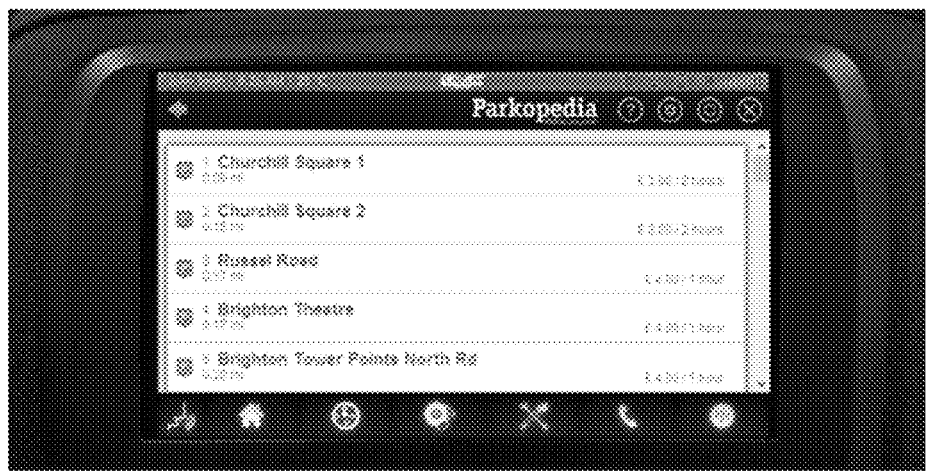
FIG. 17 illustrates an exemplary depiction of the results screen for the in-vehicle parking application embodiment.

FIG. 17 depicts an illustration of the results page listing of the parking for either the current location or the destination as selected on the initial menu of the in-vehicle application embodiment. Selection of one of the parking space listings will take the user to the details page.

Figure 18:
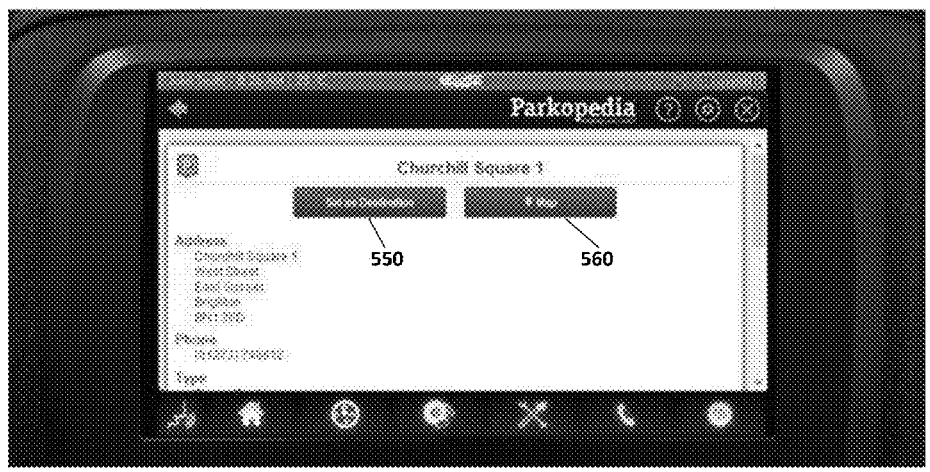
FIG. 18 illustrates an exemplary depiction of the results details screen for the in-vehicle parking application embodiment.
Figure 19:
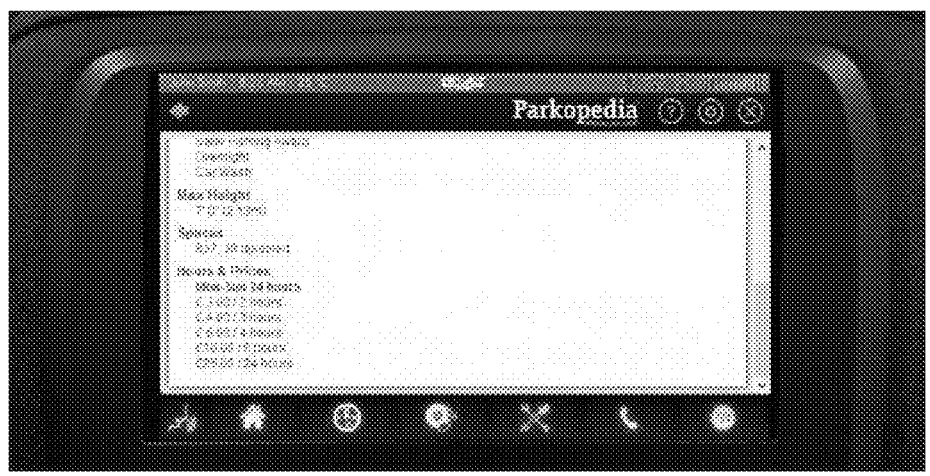
FIG. 19 illustrates an exemplary depiction of the details screen for the in-vehicle parking application embodiment.

FIGS. 18 and 19 depict the example results page of the in-vehicle application embodiment. This page provides details about the parking space including address, phone number, type of parking, maximum height for parking, number of spaces, hours and pricing. The results page allows the user 114 to select this parking space as destination by selecting the "Set as Destination" button 550 or view on a map by selecting the Map button 560.

Figure 20:
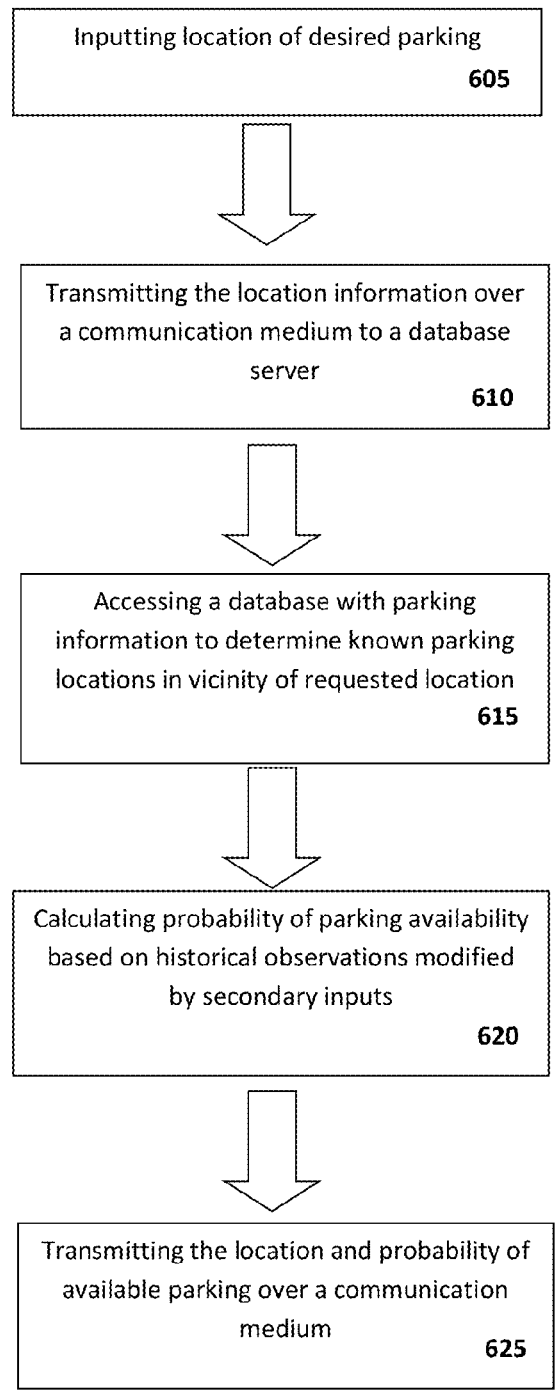
FIG. 20 illustrates an exemplary method of locating available parking spaces.

FIG. 20 illustrates an exemplary method of locating available parking spaces. In one embodiment, the method starts by inputting the location of desired parking 605. This can be accomplished by entering the geographic coordinates such as latitude/longitude, entering the name of a city, town or known geographic reference, entering a postal zip code or by selecting the location on a map display.

In one embodiment, the method transmits the location information over a communication medium such as the internet to a database server 610.

In one embodiment, the method accesses a database with parking information to determine known parking locations in vicinity of the requested location 615. Various database servers and filing techniques may be used to store and access the available parking information.

In one embodiment, the method calculates the probability of available parking 620 using various inputs such as floating car data (FCD), space counts reported by parking attendants, space counts as reported by automated parking enforcement systems, historically observed parking spaces, satellite or web camera images of parking, electronic points-of-sale data, pedestrian traffic count systems, state of public transportation, weather, planned events, historical parking transaction, time of day, day of week and month. These inputs can vary from location to location and be varied as required to result in a more accurate prediction for that location.

In one embodiment, the method transmits the location and availability of available parking over a communication medium 625. The method may transmit additional information such as price, more detailing information regarding the parking location such as street address and parking restrictions.

The disclosed embodiments are susceptible to various modifications and alternative forms, and specific examples thereof have been shown by way of example in the drawings and herein described in detail. It should be understood, however, that the disclosed embodiments are not meant to be limited to the particular forms or methods disclosed, but to the contrary, the disclosed embodiments are to cover all modifications, equivalents, and alternatives.

The invention claimed is:

1. A method for locating parking spaces implemented on a processor, comprising:
   transmitting via an electronic device a requested location where parking is desired to a database server over a communication medium;
   calculating on the processor a probable parking space location in a vicinity of the requested location based on calculation of a change in speed of a source of a plurality of floating cellular data stored in a database electronically connected to the database server, wherein the floating cellular data captures an arrival and a departure of vehicles from the requested location based on the calculation of the change of speed of the source of the plurality of cellular signals to differentiate between pedestrian and vehicle movement; and
   transmitting to the electronic device the location and probability of a parking space over the communication medium.

2. The method of claim 1, wherein the requested location for parking is entered and transmitted from a portable electronic device.

3. The method of claim 1, wherein the probable parking space locations are depicted on an electronic depiction of a street map.

4. The method of claim 1, wherein the database server refines predictions of parking space availability based on a plurality of floating car data that captures vehicle movement information from vehicles driving around the requested location looking for a space.

5. The method according to claim 1, wherein the database server refines predictions of parking availability trends for the requested location based on historical parking space counts collected throughout a selected day and extrapolates future availability based on said trends.

6. The method according to claim 1, wherein the database server adjusts predictions of real-time parking space availability from the historical availability trends using inputs including current day of the week, month, time of the day, weather, state of the public transport system, planned events, real-time availability in adjacent parking lots and streets, real-time parking payment transactions, real-time Electronic Point of Sale (EPOS) transactions, real-time traffic and floating car data, real-time imagery (satellite or camera-based), real-time space availability as reported by parking enforcement systems, real-time space availability as reported by a user.

7. A computer implemented method suitable for implementation on a processor comprising:
   transmitting via an electronic device a requested location where parking is desired to a database server over a communication medium;
   calculating on the processor a probable parking space location in a vicinity of the requested location based on calculation of a change in speed of a source of a plurality of floating cellular data stored in a database electronically connected to the database server, wherein the floating cellular data captures an arrival and a departure of vehicles from the requested location based on the calculation of the change of speed of the source of the plurality of cellular signals to differentiate between pedestrian and vehicle movement; and
   transmitting the location and probability of a parking space over the communication medium to the electronic device wherein said transmitting and calculating is performed by a processor.

8. The method of claim 7, wherein the requested location for parking is entered and transmitted from a portable electronic device.

9. The method of claim 7, wherein the probable parking space locations are depicted on an electronic depiction of a street map.

10. The method of claim 7, wherein the database server refines predictions of parking space availability based on a plurality of floating car data that captures vehicle movement information from vehicles driving around the requested location looking for a space.

11. The method according to claim 7, wherein the database server refines predictions of parking availability trends for the requested location based on historical parking space counts collected throughout a selected day and extrapolates future availability based on said trends.

12. The method according to claim 7, wherein the database server adjusts predictions of real-time parking space availability from the historical availability trends using inputs including current day of the week, month, time of the day, weather, state of the public transport system, planned events, real-time availability in adjacent parking lots and streets, real-time parking payment transactions, real-time Electronic Point of Sale (EPOS) transactions, real-time traffic and floating car data, real-time imagery (satellite or camera-based), real-time space availability as reported by parking enforcement systems, real-time space availability as reported by a user.

13. A system for locating parking spaces, comprising:
    an electronic device in communication with a database server, the database server connected to a database, wherein the database server is capable of predicting parking space information for an area based on information stored in the database;
    wherein the database server predicts parking space availability based on calculation of a change in speed of a source of a plurality of floating cellular data, wherein said floating cellular data captures the arrival and departure of vehicles from the requested location based on the calculation of the change of speed of the source of the plurality cellular signals to indicate pedestrian versus vehicle movement;
    wherein the database contains a plurality of parking space data and the parking space availability is transmitted to the electronic device.

14. The system of claim 13, wherein the electronic device is incorporated into a vehicle.

15. The system of claim 13, wherein the database server refines predictions of parking space availability from analysis of a plurality of floating car data that captures vehicle movement information from vehicles driving around a block looking for a space.

16. The system according to claim 13, wherein the database server refines predictions of parking availability trends for the requested location based on historical parking space counts collected throughout a selected day and extrapolates future availability based on said trends.

17. The system according to claim 13, wherein the database server makes real-time parking space availability adjustments to the historical availability trends using inputs including current day of the week, month, time of the day, weather, state of the public transport system, planned events, real-time availability in adjacent parking lots and streets, real-time parking payment transactions, real-time Electronic Point of Sale (EPOS) transactions, real-time traffic and floating car data, real-time imagery (satellite or camera-based), real-time space availability as reported by parking enforcement systems, real-time space availability as reported by a user.

* * * * *